M. E. EMERY AND W. J. FLEISCHAUER.
COLLAPSIBLE HAND TRUCK.
APPLICATION FILED SEPT. 26, 1921.
1,409,838.
Patented Mar. 14, 1922.
2 SHEETS—SHEET 1.
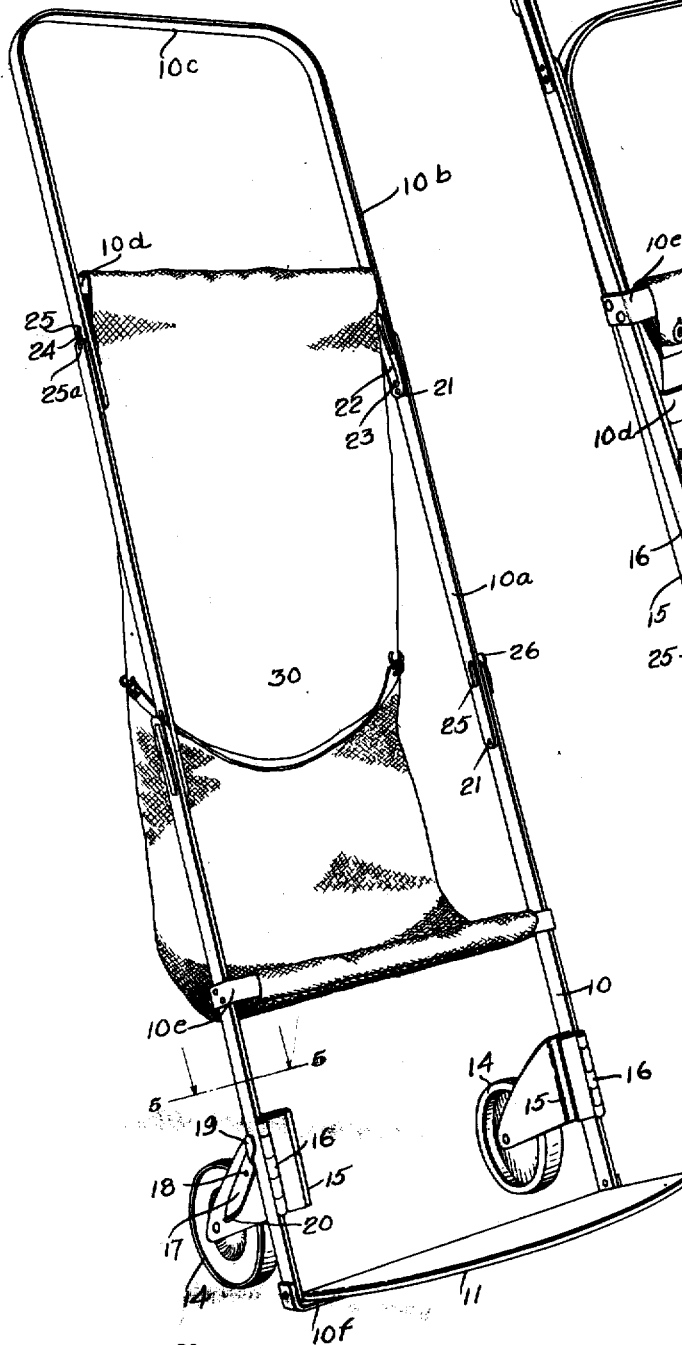
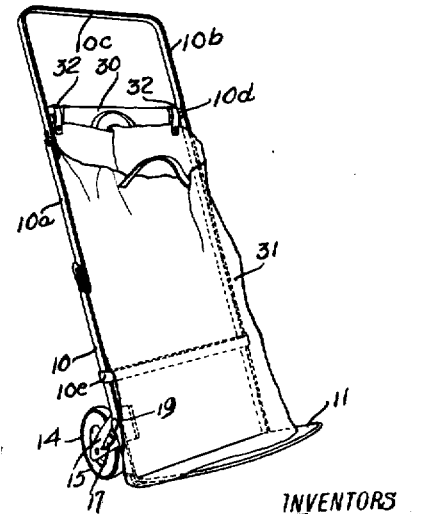
WITNESSES
INVENTORS
WILLIAM J. FLEISCHAUER
MARSHALL E. EMERY
BY
ATTORNEYS

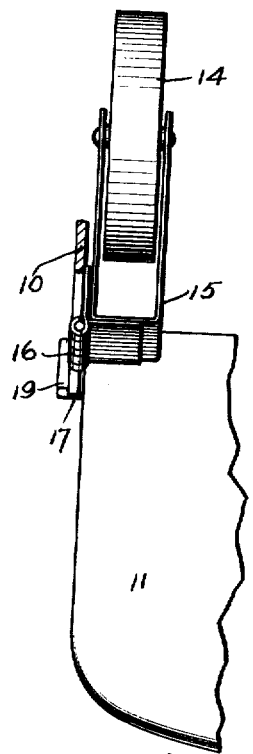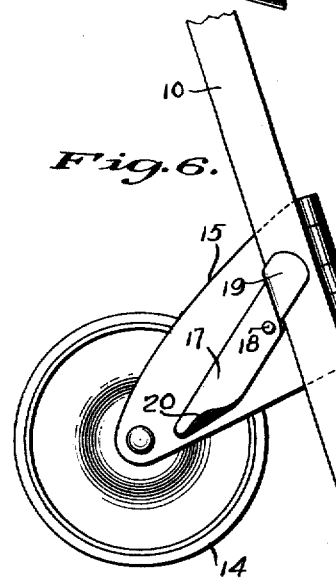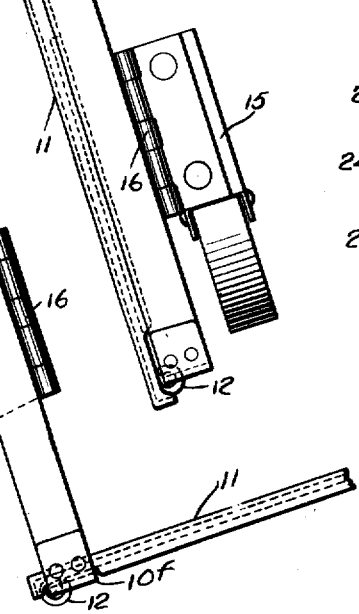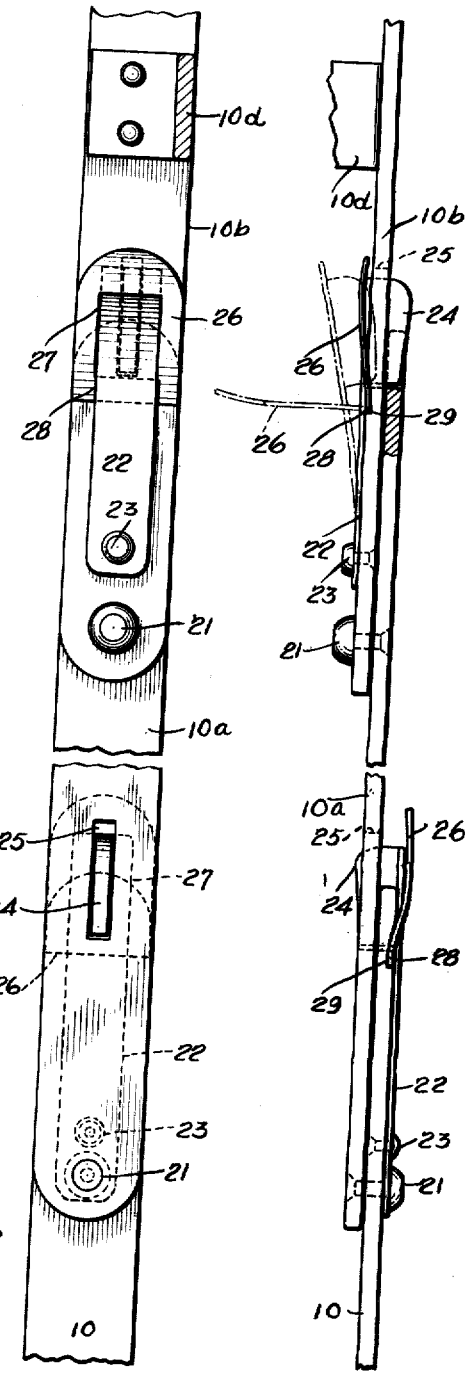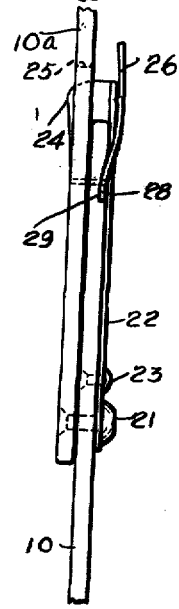

UNITED STATES PATENT OFFICE.

MARSHALL EUGENE EMERY AND WILLIAM JOHN FLEISCHAUER, OF DETROIT, MICHIGAN.

COLLAPSIBLE HAND TRUCK.

1,409,838.   Specification of Letters Patent.   Patented Mar. 14, 1922.

Application filed September 26, 1921. Serial No. 503,419.

*To all whom it may concern:*

Be it known that we, MARSHALL E. EMERY, a citizen of Canada, and WILLIAM J. FLEISCHAUER, a citizen of the United States, and residents of Detroit, in the county of Wayne and State of Michigan, have invented a new and Improved Collapsible Hand Truck, of which the following is a description.

Our invention relates to a hand truck and more particularly to a collapsible hand truck designed especially for use in shopping on the cash-and-carry plan as is largely the custom in buying groceries and similar goods.

The general object of our invention is to provide a truck that may be readily collapsed into small compass and which will form a stable structure when in use.

A further object of the invention is to provide a hand truck which when set up will be available for wheeling a child when it is not desired for carrying purchases.

The nature of the invention and its distinctive features and advantages will more clearly appear as the description proceeds.

Reference is to be had to the accompanying drawings forming part of this specification, it being understood that the drawings are merely illustrative of one example of the invention.

Figure 1 is a perspective view of a hand truck embodying our invention showing a flexible back or apron, the bag hereinafter described being omitted;

Figure 1ª is a perspective view of the set-up truck on a reduced scale, and showing the bag thereon, said bag being adapted to be filled with merchandise or available as a flexible seat and back on which a child may recline;

Figure 2 is a perspective view of the collapsed truck;

Figure 3 is an enlarged side elevation of a portion of the frame showing one means for fastening the collapsible frame sections;

Figure 4 is a fragmentary side elevation of the frame, part being broken away;

Figure 5 is an enlarged cross section on the line 5—5, Figure 1;

Figure 6 is a side elevation of the parts shown in Figure 5;

Figure 7 is a side elevation of the parts shown in Figure 6 but showing the wheels in folded position.

In carrying out our invention in accordance with the illustrated example a handled frame is provided formed of collapsible sections 10, 10ª, 10ᵇ, there being three of said sections in the illustrated example. The top frame section 10ᵇ is of bowed form to present a cross handle 10ᶜ at the rear end of the frame. A cross bar 10ᵈ is provided between the sides of the rearmost section 10ᵇ and a cross bar 10ᵉ connecting the sides of the forward frame section 10 as well as a front cross bar 10ᶠ connecting the extreme front or lower ends of said section 10. Supported at the front of the frame is a foot 11 extending transversely and having sufficient area to form a rest as for a filled bag. Said foot 11 is hingedly connected with the cross bar 10ᶠ by straps 12 on said foot, the ends of the bars being turned into hinge knuckles 13 that pass through slots 10ᵍ in the cross bar 10ᶠ.

Wheels 14 are provided turning in hangers 15, here shown as of U-shape, said hangers being secured by hinges 16 to the sides of the forward frame section 10. The arrangement is such that with the wheels swung to positions for using the truck, the said wheels and their hangers 15 lie at the inner sides of the side bars of frame section 10. The hinges permit the hangers with the wheels to be swung upwardly and outwardly through an arc of more than 180° to dispose the wheels temporarily at the outer sides of the frame to allow clearance for the foot 11 to be folded down within the forward section 10 in a plane parallel with the latter as shown in Figures 2 and 7 and adjacent to the back of the frame. The foot 11 having been folded adjacent the frame, the hangers 15 and wheels are lowered into approximate parallelism with the frame when the truck is to be collapsed. On each wheel hanger 15 is a latch plate 17 pivoted as 18 between its ends and formed at one end with an offset portion 19 adapted to overlie a side bar on frame section 10 at the opposite side from the hanger 15 to hold the wheel in a plane to run on the ground at the under side of the frame. The opposite end 20 of each latch 17 is curved over to form a finger-hold for turning the latch to latching or release position.

As one manner of permitting the collapsing of the frame the sections 10, 10ª, 10ᵇ are made to overlap one another, the overlapped ends being pivoted as at 21. To lock the frame sections in alinement with each other we provide at each joint a flat latch spring 22 riveted or otherwise secured as at 23 to the forward end of one frame section, the rear end of said latch spring having a latch head 24. The latch may be disposed at the outside or inside of the frame sections. We have shown those latches 22 at the joint between the forward section 10 and the next rearward section 10ª as disposed at the outside of the frame and those at the joints of the two rear sections 10ª, 10ᵇ disposed at the inside of the frame. The latch head 24 is adapted to engage in a slot 25 in one frame bar a short distance from the pivot 21 of the bar and engage also in an end notch 25ª in the extreme end of the adjacent bar.

The arrangement is such that with the latch on the outside the latch head 24 will extend through the notch 25ª and into slot 25, whereas a latch 22 at the inside of the frame will extend through a slot 25 and then into the notch 25ª as will be readily understood.

In order to withdraw the latch head 24 from the position of latching engagement, we provide a lever plate 26 presenting a central cut-out 27, the latch 22 overlying the cross bar 28 at the inner end of the lever plate and lying in said opening 27. As will be readily understood from Figures 3 and 4, a lever plate 26 may be swung for example from the full line position of Figure 4 to the dotted line position so that its cross bar 28 will stress the spring latch 22 and withdraw the latch head 24 from the latching position. To hold the latch plate 26 in the dotted line position of Figure 4 with the latch head 24 in the release position and the latch spring 22 stressed, we form a notch 29 in that frame section to which the latch is riveted so that the cross bar 28 will engage in said notch in the release position of the lever plate.

We would state in conclusion that while the illustrated example constitutes a practical embodiment of our invention, we do not limit ourselves to the exact details herein illustrated, since manifestly the same can be considerably varied without departure from the spirit of the invention as defined in the appended claims.

Having thus described our invention, we claim:

1. A collapsible hand truck including a frame, a foot carried by the frame at the front end and swingable to project at an angle to the frame to constitute a rest or to fold adjacent to the frame, and truck wheels on the frame adjacent to and rearward of said foot, together with means mounting said wheels and foldable laterally inward onto said frame.

2. A collapsible hand truck including a frame, a foot carried by the frame at the front end and swingable to project at an angle to the frame to constitute a rest or to fold adjacent to the frame, and truck wheels on the frame adjacent to and rearward of said foot, said wheels being swingably mounted to fold over the foot when the latter lies adjacent to the frame.

3. A hand truck comprising a frame, a foot hinged to the frame at the front end to fold adjacent to the frame, hangers on said frame adjacent to said foot, and wheels turning in said hangers, said hangers being swingable inwardly and upwardly through an arc to permit the foot to fold adjacent to the frame, the hangers being adapted to lie over the folded foot.

4. In a collapsible truck, a frame, wheeled hangers hinged to the frame to fold laterally inward and latches on said hangers adapted to engage the frame when the wheels are positioned for running.

5. In a collapsible truck, a frame, hangers hinged to the frame near the front end, and truck wheels carried by said hangers, said frame presenting side bars and said hangers being disposed at the inner sides of the frame bars when the wheels are in position for use, and latches on said hangers in position to engage said frame bars at the outer sides thereof.

6. A hand truck including a collapsible frame, wheels, means mounting said wheels on the frame near the front end, and a foot on the frame forward of said wheels, said foot being foldable rearwardly to a position adjacent to the collapsed frame and said wheel mounting means being foldable onto the collapsed frame and over the folded foot.

7. A hand truck including a frame formed of overlapping sections pivoted to one another, and lateral flexible spring latches each secured at one end to one frame section and formed at its opposite end with a lateral latch head, the overlapped ends of the sections being adapted to jointly receive said latch heads when said sections are set up for use.

8. A hand truck including a collapsible frame, having a cross bar near the rear end thereof, a foot hinged to said frame at the front end and swingable to a position to form a rest or to a position adjacent to the collapsed frame, and a flexible carrier adapted to rest on said foot and having means to secure it to said cross bar.

9. A hand truck including a frame formed of collapsible sections, wheels on the front section, cross bars on two of said sections rearward of the front end of the frame, a flexible back secured to cross bars of two of the sections, and a foot swingably mounted on the front section near the front end thereof to fold onto the collapsed frame.

MARSHALL EUGENE EMERY.
WILLIAM JOHN FLEISCHAUER.